United States Patent [19]
Werzberger

[11] Patent Number: 5,951,298
[45] Date of Patent: Sep. 14, 1999

[54] INTERACTIVE BOOK ASSEMBLY

[76] Inventor: Bernice Floraine Werzberger, 1252 Mayfair Dr., Atlanta, Ga. 30324

[21] Appl. No.: 08/838,585

[22] Filed: Apr. 10, 1997

Related U.S. Application Data

[63] Continuation-in-part of application No. 08/518,480, Aug. 23, 1995, Pat. No. 5,639,240, which is a continuation-in-part of application No. 08/294,442, Aug. 23, 1994, Pat. No. 5,558,520.

[51] Int. Cl.$^6$ .............................. G09B 17/00; B42D 1/00; A63H 33/38
[52] U.S. Cl. ........................... 434/178; 281/15.1; 283/99
[58] Field of Search ............................. 281/15.1; 283/72, 283/99; 434/156, 167, 176, 178

[56] References Cited

U.S. PATENT DOCUMENTS

| | | |
|---|---|---|
| D. 295,538 | 5/1988 | Stajan et al. .............................. D19/59 |
| 1,456,834 | 5/1923 | Sheffield . |
| 1,530,418 | 3/1925 | Saylor . |
| 1,572,392 | 2/1926 | Koehrman .......................... 281/15.1 X |
| 2,628,435 | 2/1953 | Minninger et al. ..................... 434/167 |
| 3,200,514 | 8/1965 | Kopel . |
| 3,242,596 | 3/1966 | Smith . |
| 3,426,447 | 2/1969 | Montgomery . |
| 3,730,818 | 5/1973 | Salinari . |
| 4,308,017 | 12/1981 | Laughon et al. ......................... 434/169 |
| 4,575,126 | 3/1986 | Grubbs ....................................... 283/38 |
| 4,701,130 | 10/1987 | Whitney et al. ......................... 434/118 |
| 4,712,673 | 12/1987 | Moore ..................................... 206/232 |
| 4,714,275 | 12/1987 | Engel et al. ......................... 434/178 X |
| 4,973,184 | 11/1990 | La Salle ................................... 402/70 |
| 4,978,143 | 12/1990 | Ericson ..................................... 283/38 |
| 5,029,902 | 7/1991 | Komori ..................................... 283/56 |
| 5,056,824 | 10/1991 | Olson ....................................... 283/36 |
| 5,141,253 | 8/1992 | Rice .................................... 281/15.1 X |
| 5,161,978 | 11/1992 | Kahn ....................................... 434/348 |
| 5,165,721 | 11/1992 | Schwartz ............................... 281/15.1 |
| 5,256,067 | 10/1993 | Gildea et al. ........................... 434/169 |

(List continued on next page.)

OTHER PUBLICATIONS

"Inventors and Inventions A Supplement to Childcraft—The How and Why Library," World Book, Inc., © 1993, pp. 90–97.

"A Survey of Hypertext," MCC Technical Report Number STP–356–86, Rev. 2, Jeff Conklin, Software Technology Program, Dec. 3, 1997, pp. 23, 27, 40 and 44.

"Earthsearch, A Kids Geography Museum In A Book" by John Cassidy, © 1994 Klutz Press, Palo Alto, California, pp. 38, 47–50, 86–89.

Two screens from Hypercard Tour, Apple Computer, 1990.

*Primary Examiner*—John A. Ricci
*Attorney, Agent, or Firm*—Jones & Askew

[57] ABSTRACT

An interactive coordinated book assembly, comprising a plurality of pages, which are bound along an edge to form a book. Each page contains textual material, key indicia and an activity area. Each activity area contains instructions for conducting an activity. The activity is coordinated with the key indicia appearing on a simultaneously visible one of the plurality of pages. The key indicia can be any device capable of visually or tactilely distinguishing a portion of the text, allowing it to be associated with the activity. The key indicia are preferably selected from a group consisting of a word, a phrase, a sentence, a symbol, an object, a font, highlighting, an icon, and a color code in the textual material and are visually distinguishable from the surrounding textual material on the pages. The activity area typically, but not necessarily, contains pictorial material that is related to the activity, which is described in the activity area. Examples of activities include pictures, puzzles, mazes, and other graphical or textual instructions. Each activity may have a code associated therewith for designating the age level appropriate for the particular activity and for designating the activity type. The assembly can further include an age level translation guide associated with the assembly, wherein the translation guide contains the code designations of the age levels and the activity types, as well as a translation into understandable equivalents.

14 Claims, 11 Drawing Sheets

U.S. PATENT DOCUMENTS

| | | | |
|---|---|---|---|
| 5,269,563 | 12/1993 | Michlin | 281/15.1 |
| 5,273,433 | 12/1993 | Kaminski et al. | 434/169 |
| 5,367,621 | 11/1994 | Cohen et al. | 395/154 |
| 5,387,104 | 2/1995 | Corder | 434/156 |
| 5,388,993 | 2/1995 | McKiel et al. | 434/118 |
| 5,395,243 | 3/1995 | Lubin et al. | 434/118 |
| 5,442,759 | 8/1995 | Chiang et al. | 395/375 |
| 5,466,158 | 11/1995 | Smith, III | 434/317 |
| 5,511,160 | 4/1996 | Robson | 395/162 |
| 5,517,407 | 5/1996 | Weiner | 364/419.01 |

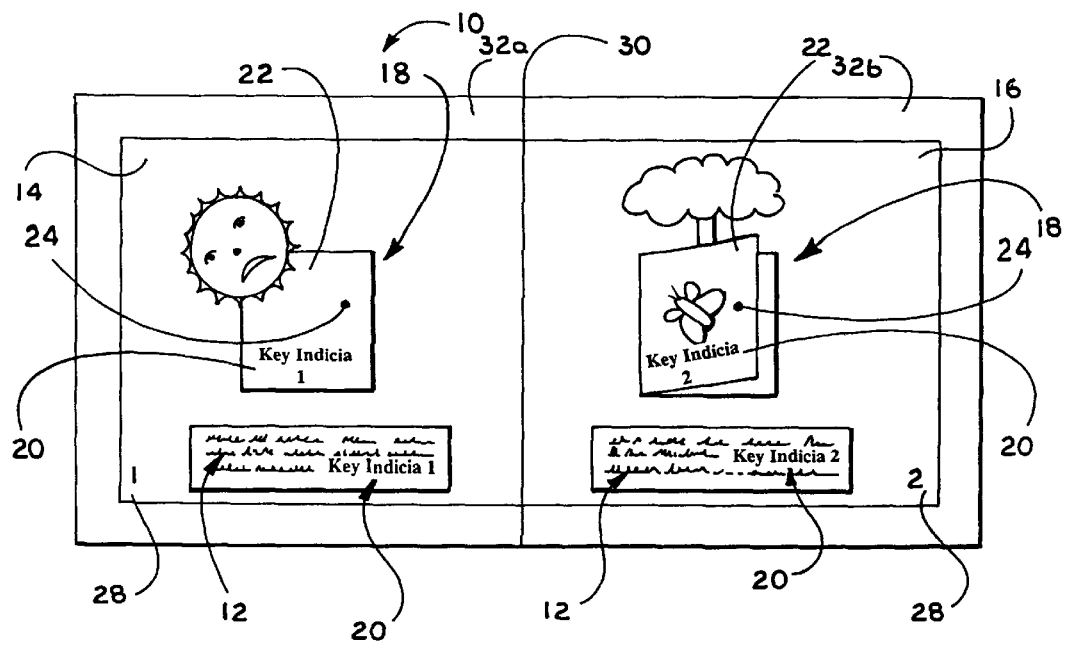
Fig_1A
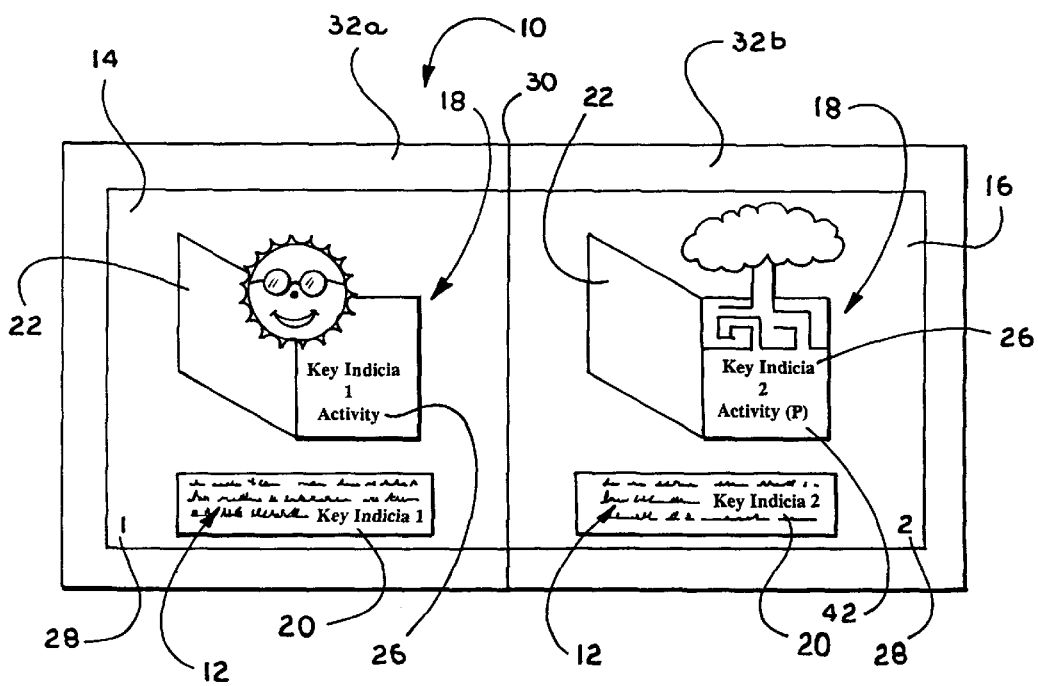
Fig_1B

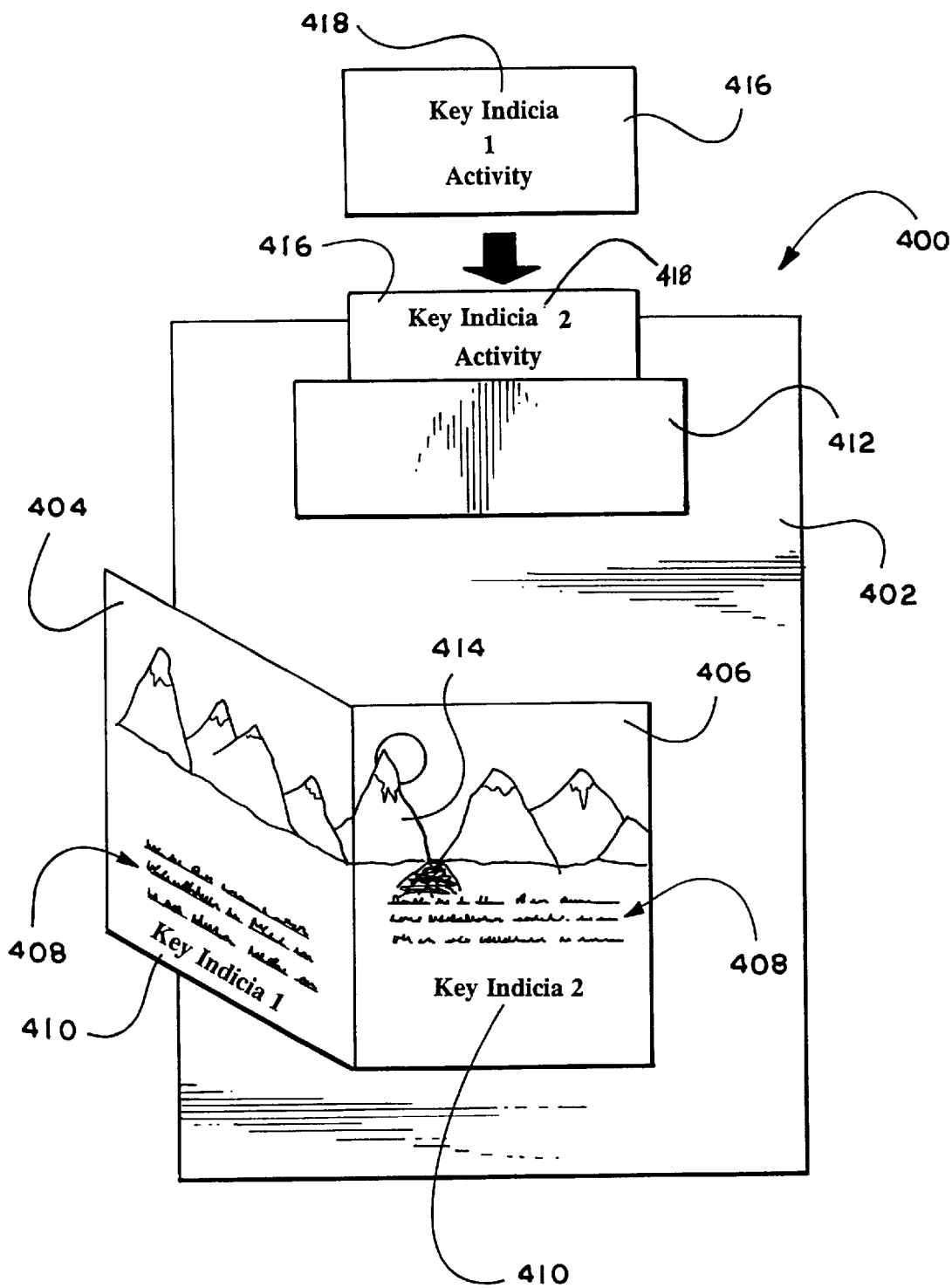
Fig_9

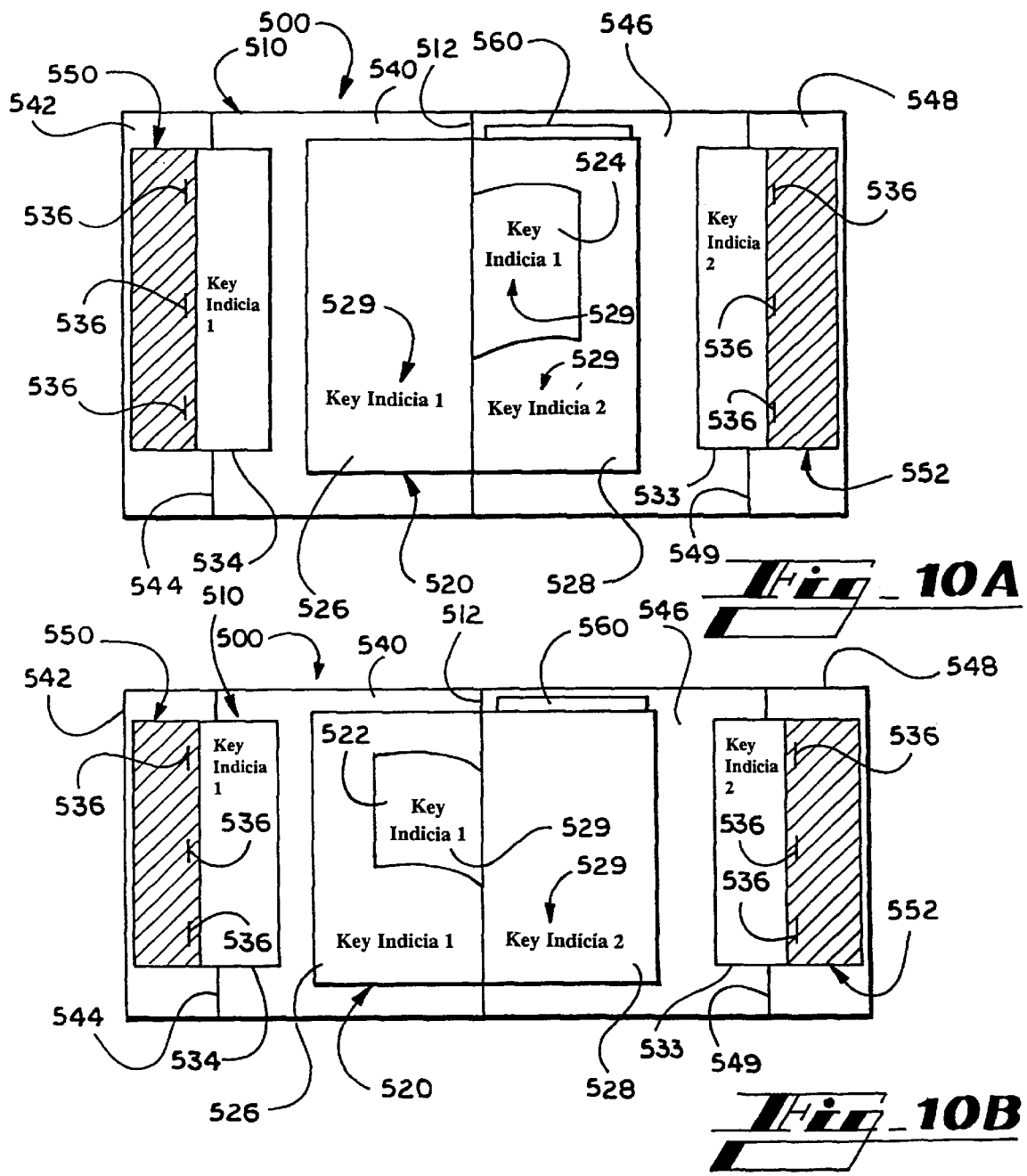

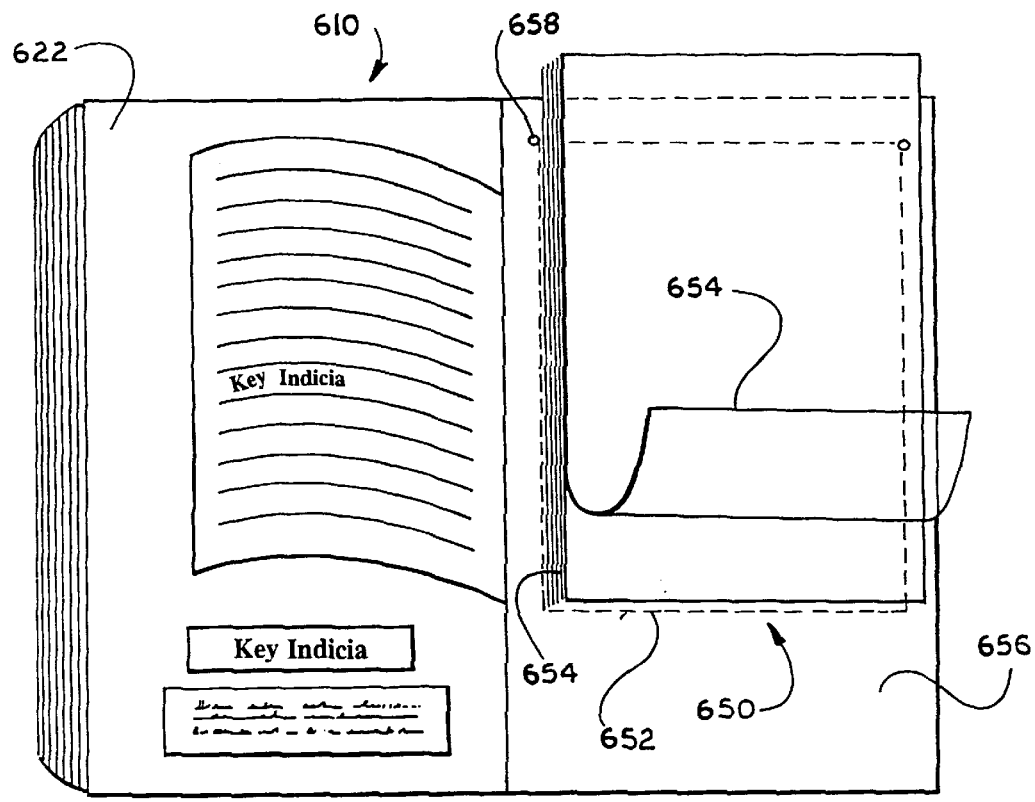
Fig_11
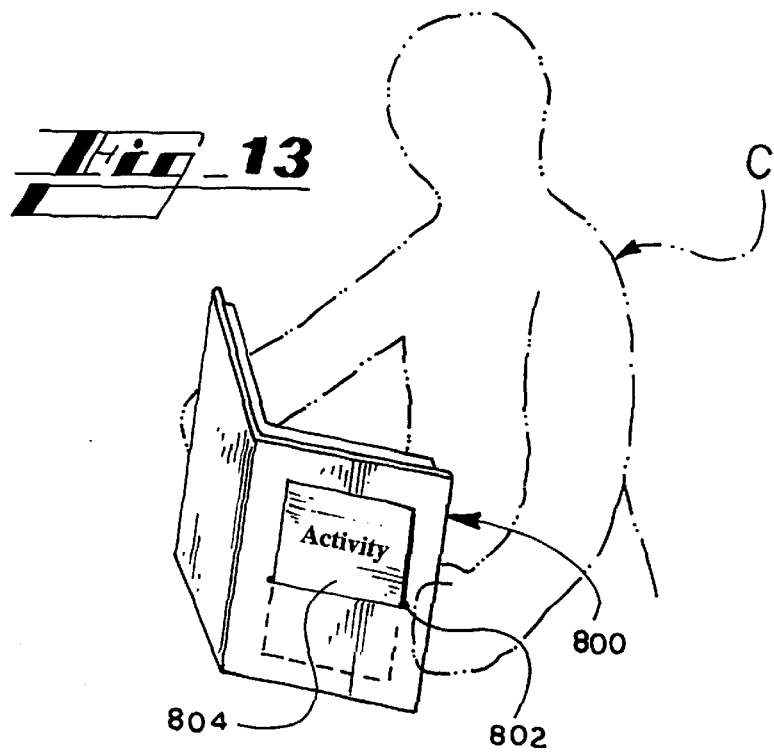
Fig_13

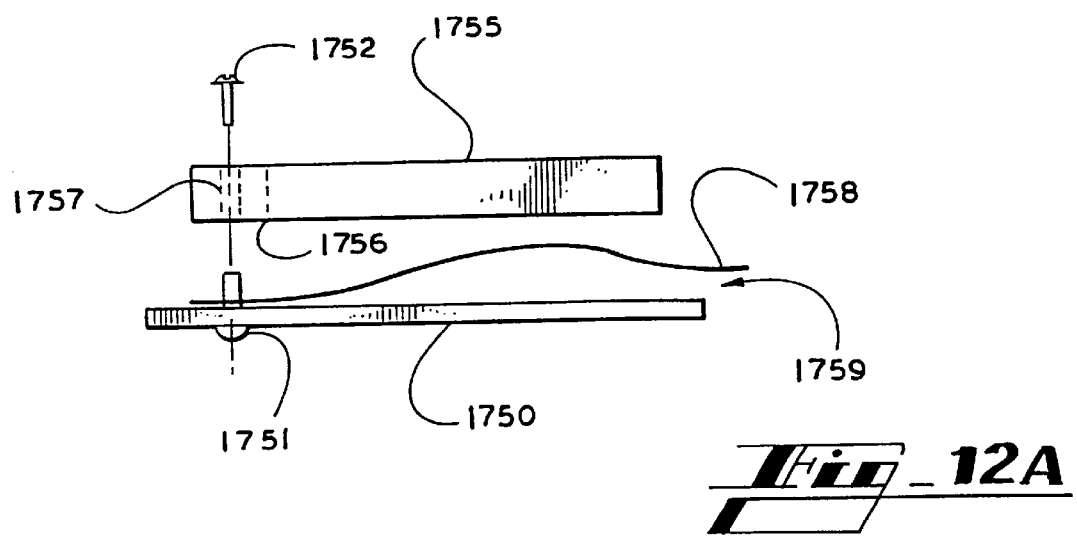
Fig_12A
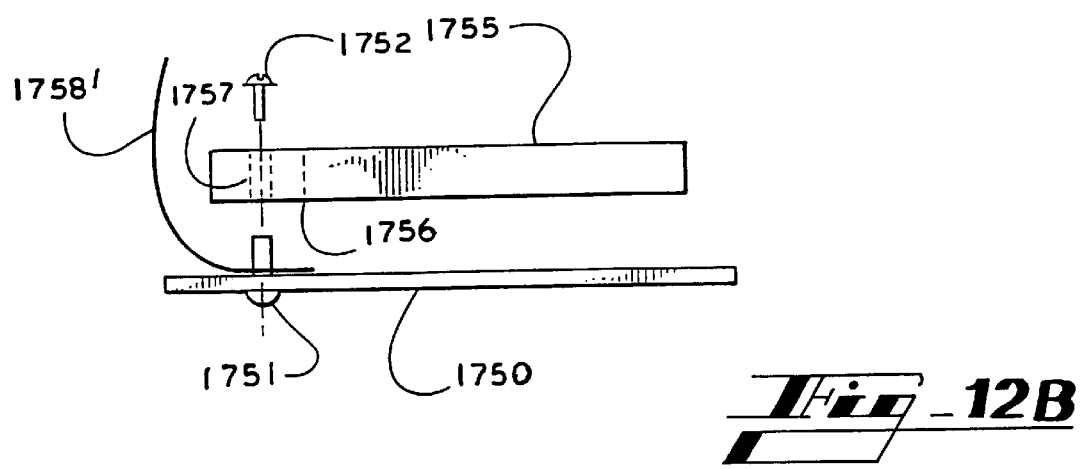
Fig_12B
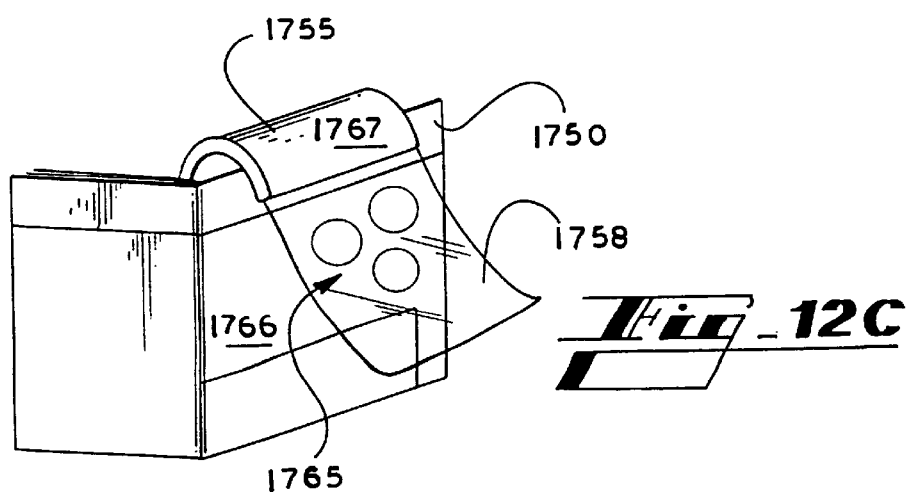
Fig_12C

INTERACTIVE BOOK ASSEMBLY

CROSS REFERENCE TO RELATED APPLICATION

This application is a continuation-in-part of co-pending application Ser. No. 08/518,480 filed Aug. 23, 1995, now U.S. Pat. No. 5,639,240, which is a continuation-in-part of application Ser. No. 08/294,442, filed Aug. 23, 1994, now U.S. Pat. No. 5,558,520.

TECHNICAL FIELD

The present invention relates to instructional or educational book assemblies, and more particularly to an interactive coordinated set of textual and activity materials designed to be used by parent and child with activities for developing a child's skills being indexed to key indicia in a story text.

1. Background of the Invention

There are many types of educational or instructional materials that utilize a main book that a student uses and a separate guide book or "teacher's manual" that a teacher uses, which explains or interrelates with the subject matter of the main book. Frequently, these guide books can be used in several ways, including: instructing the teacher how to teach the subject matter; providing instructions for implementing a given lesson; giving additional ideas on activities for the lesson and the like. They are typically designed for a classroom situation where one teacher will be interacting with many students. One of the problems with these types of guide books is that they are not adequately interactive with the student's book. It is difficult for a teacher and student to sit together on a one-to-one basis and interact because the teacher must use a different book than the student, causing coordination problems and the need for two books. Additionally, these types of teacher/student books are not effectively coordinated to make use of important words or phrases in the student's text and to ask questions, discuss or otherwise teach on such an individualistic basis. The same is true for parents since no interactive guide exists.

In the context of the present specification, the invention discussed herein is primarily designed for use by a parent and child so that the child can use it alone or with a parent or other adult. The terms parent and child will be used to describe a relationship between a developmentally advanced person and a less advanced person, and are intended to include terms such as teacher and student.

It would be desirable to have a unified book that would facilitate one-on-one skill development such that the teacher would be able to interact with the student using the same materials, such as where language-based skills are being taught. Such a unified book would be desirable for parents while reading to and teaching their children.

2. Background of the Prior Art

Several patents have issued relating to indexed text and answer or text and auxiliary book assemblies, including U.S. Pat. Nos. 1,456,834 (Sheffield); 3,200,514 (Kopel); 3,242,596 (Smith); 3,426,447 (Montgomery); 5,056,824 (Olson); and 5,161,978 (Kahn). Kopel discloses an instructional device for self-administration of tests, where questions are visible on both sides of a main booklet and answers are contained in a separate area that is hidden by a sliding tab that reveals an answer when the area is exposed. Smith discloses a combination of learning materials and some scoring tests in which a removable auxiliary book containing a dictionary, index, and/or quiz is located at the back of the main book. Montgomery discloses an instructional book in which answers are interleaved upside down and across from questions.

It would be desirable to have a book that is indexed such that the text is indexed and adjacent to a direction or activity area for direct use by a parent or teacher.

It would be desirable to have an interactive book assembly that is organized to present a story text that can be read or followed by a child and interrelated activities that are indexed to words in the story or the story content.

It would also be desirable to have an interactive book assembly that allows a child to develop his or her motor skills while developing other important skills such as perception, visual memory, writing and the like.

It would also be desirable to have an interactive book assembly that allows a teacher to coordinate activities with key indicia for more than one student based on each student's skill level without having to use different books.

SUMMARY OF THE INVENTION

The present invention satisfies the above-described needs by providing in one embodiment an interactive coordinated book assembly, comprising a plurality of pages, wherein each page contains textual material, key indicia and an activity area. Each activity area contains instructions for conducting an activity. The activity is coordinated with the key indicia appearing on a simultaneously visible one of the plurality of pages. The key indicia can be any device capable of visually or tactilely distinguishing a portion of the text, allowing it to be associated with the activity. The pages are also bound along an edge to form a book.

Examples of key indicia are a word, a phrase, a sentence, a symbol, an object, a font, an icon, highlighting, a tab, a ribbon, or a color code in the textual material. When the key indicia are a word, the key word is visually distinguishable from the surrounding textual material on the pages. The activity area typically, but not necessarily, contains pictorial material that is related to the activity, which is described in the activity area. Examples of activities include pictures, puzzles, mazes, and other graphical or textual instructions. Each activity may have a code associated therewith for designating the age level appropriate for the particular activity and for designating the activity type. The assembly can further include an age level translation guide associated with the assembly, wherein the translation guide contains the code designations of the age levels and the activity types, as well as a translation into understandable equivalents.

More particularly described, in a preferred embodiment of the present invention, the activity area has means for movably revealing the activity in the activity area. The revealing means can be a flap that opens to reveal the activity and closes to conceal the activity, a rotating dial having a window for viewing the activity, a rotating scroll, or a rotating disk having a grasping tab.

The preferred method for presenting information using the preferred book assembly comprises the steps of turning the pages and moving the revealing means on each of the pages so as to reveal the activity coordinated with the key indicia for each of the pages. These steps could be performed, for example, by a child reading the book with a parent.

In an alternative embodiment of the present invention, the activity area has a pullable sliding tab. The pullable sliding tab contains instructions for conducting an activity that is coordinated with the key indicia appearing on the same one of the plurality of pages. The pullable sliding tab is operative to reveal the activity in the activity area when the pullable sliding tab is pulled.

An alternative method for presenting information using the alternative embodiment of the book assembly comprises the steps of turning the pages and pulling the pullable sliding tab on each of the pages so as to reveal the activity coordinated with the key indicia for each of the pages.

According to another aspect of the present invention there is provided an interactive coordinated book assembly kit adaptable for multiple skill levels, comprising at least one set of removable cards and a book assembly. Each card contains instructions for conducting an activity. The book assembly comprises a plurality of pages, wherein each page contains textual material, key indicia and an activity area. Each activity area is capable of receiving at least one of the cards from the set of removable cards. The card is inserted into the activity area on one of the plurality of pages such that the activity on the card is coordinated with the key indicia appearing on the same one of the plurality of pages. The pages are bound along an edge to form a book.

In addition, at least one set of removable cards is designated for a specific age level. Each card in the set of removable cards preferably indicates an activity type for each activity.

According to still another aspect of the present invention, there is provided an interactive coordinated book assembly, comprising a plurality of left and right main pages. Each of the main pages contains an activity area and a direction text area disposed on a predetermined portion of the main page. The assembly also comprises a plurality of left and right text pages containing textual material and respective key indicia on each text page. The main pages and the text pages are alternately interleaved and bound along one edge to form a book. The direction text area contains instructions for conducting an activity, which is located on the activity area and is coordinated with the key indicia appearing on a simultaneously visible one of the plurality of main pages.

With respect to this embodiment, at least some of the text pages can be smaller than the main pages so as not to cover any of the predetermined portion of the main page occupied by the activity area or directional text. In addition, at least some of the main pages can contain an illustration that is at least partially covered by a portion of an adjacent text page, wherein the text page includes an overlay picture on at least a portion thereof at its periphery so as to change the appearance of the illustration on the main page when the text page is alternately overlaid on and removed from the main page.

More particularly described, this embodiment of the present invention can further comprise means for attaching at least one sheet of tracing paper and a transparent flexible colored web to a cover of the book assembly so that the web and the tracing paper may overlay the main pages in a sandwiched configuration. The means for attaching preferably comprises a pair of posts secured to the cover and further comprises a pad of tracing paper through which the posts pass. The pad preferably is made up of a plurality of perforated sheets of tracing paper that may be torn from the pad, one at a time.

Furthermore, the assembly can preferably have a front and a back cover, wherein the covers comprise a stiff backing material bound along a similar seam as the main pages and the activity pages. The tracing pad is preferably removably attachable to said front or back cover. It may sometimes be desirable to have a first tracing pad removably attachable to the front cover and a second tracing pad removably attachable to the back cover.

According to still another aspect of the present invention, there is provided a book assembly comprising a cover, a main book, and an activity book. The main book is removably attached to the cover and comprises a plurality of main pages containing textual material and a series of key indicia appearing in sequence with at least one of the key indicia appearing on each main page. The activity book is also attached to the cover and adjacent to the main book. The activity book comprises a plurality of activity pages containing direction text and the same series of key indicia, in the same sequence on a page by page basis, as appear on the main pages.

A method of presenting information using this embodiment of the present invention comprises the steps of turning the main pages and turning the activity pages as the main pages are turned, so as to present the same key indicia on a visible main page and a visible activity page.

An alternative method of presenting information using a similar embodiment of the present invention comprises the first step of providing a plurality of left and right main pages, wherein the main pages contain textual material and one or more key indicia on each page and wherein the main pages are bound along one edge to form a book. The next step is to provide left and right activity booklets, each of which comprises a set of bound activity pages. Each activity page contains an activity area and key indicia on each page. The next step is to provide a stiff support backing comprising a left portion and a right portion, wherein the portions are attached to each other at a seam to form a book cover; a left flap comprising a stiff support backing flexibly attached to and capable of folding over onto the left portion; and a right flap comprising a stiff support backing flexibly attached to and capable of folding over onto the right portion. Finally, the last step is to turn each of the main pages of the book and each of the activity pages of the activity booklets so that the key indicia appearing on the left main page of the book matches the key indicia appearing on the activity page of the left activity book, and the key indicia appearing on the right main page of the book matches the key indicia appearing on the activity page of the right activity book.

The left activity booklet is attached to the left flap and the right activity booklet is attached to the right flap. The key indicia appearing on each of the activity pages of the right activity booklet is coordinated with the key indicia appearing on the right main page. The key indicia appearing on each of the activity pages of the left activity booklet is coordinated with the key indicia appearing on the left main page. Also, the book and the activity booklets may be removably detachable from the stiff support backing.

The present invention can be used as a parenting tool in relationship building with a child by coordinated interaction and learning. The child can read or follow along with the story itself with or without a parent being present. As often happens, children enjoy rereading the same story many times, either alone, with a parent or sibling or having it read to them. In a similar way, the invention can be used as a teaching tool by a teacher working with a student.

The present invention can also be used to facilitate individual or group learning or in higher levels of learning whereby a student working alone and learning a new language, music, science, math, or the like can learn by interacting with the main text and an activity area that explains or guides the student to greater understanding. An example of this is in learning geometry where the main text could contain a diagram of a geometric shape and a theorem or axiom. The activity area may query the student about the next step in the proof of the theorem or axiom or instruct the student to draw certain lines on an incomplete figure, or teach other developmental activities.

Accordingly, it is a principal object of the present invention to provide an educational tool that facilitates interaction between a parent (or teacher) and a child (or student) by coordinating written materials with indexed key indicia that can be the subject of learning or developmental activities facilitated by the parent (or teacher).

It is a further object of the present invention to provide an interactive book assembly having separate areas for text, (such as a story), and for activities, in which a parent or teacher can guide a child or student through activities without restructuring or rewording the directions to do the activities with the child or student as directed.

It is yet a further object of the present invention to provide an interactive book assembly that allows a child to develop his or her motor skills at the beginning of an activity while developing other important skills such as perception, visual memory, writing and the like.

It is still a further object of the present invention to provide an interactive book assembly that allows a teacher to coordinate activities with key indicia for more than one student based on each student's skill level without having to use different books.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIGS. 1A and 1B show a plan view of a preferred embodiment of the present invention.

FIG. 9 shows a plan view of an alternative eighth embodiment of the present invention.

FIGS. 10A and 10B show a plan view of an alternative ninth embodiment of the present invention.

FIG. 11 shows a plan view of an alternative tenth embodiment of the present invention.

FIGS. 12A, 12B, and 12C show an aspect of one form of the present invention particularly useful for assisting learning impaired children in tracing materials from embodiments of the present invention.

FIG. 13 shows an alternative embodiment of the present invention utilizing a pocket in an outer book cover.

DETAILED DESCRIPTION OF THE PREFERRED EMBODIMENT

Figure 2:
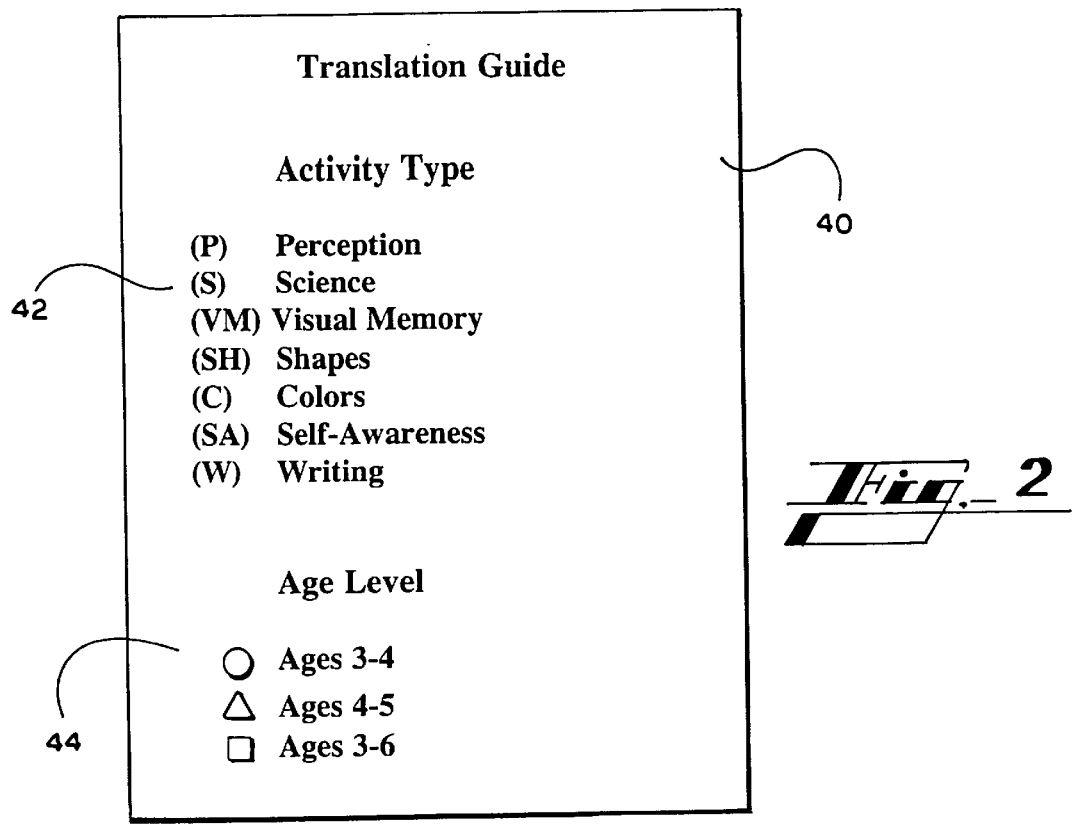
FIG. 2 shows a plan view of a translation guide page in accordance with the preferred embodiment of the present invention.

The present invention is directed to an interactive coordinated book assembly designed to be used cooperatively between a parent and child, or a teacher and student, or for self-study. The book assembly is designed such that as a story unfolds, attention is drawn to specific "key indicia" within the story. Each key indicium is coordinated with an activity, which provides a more definitive understanding of the key indicia. When the child reaches the key indicia, the child can unveil the activity associated with the key indicia by either opening a flap, turning a dial, rotating a scroll or performing a similar action. This unveiling process serves as a mechanism for developing the child's motor skills, and can lead to developing other activities in different skill areas. Once the next activity is revealed, the parent and child may work together to do the activity and further developmental activities. This procedure is then carried out for the rest of the key indicia in the story as the story continues to unfold.

The discussion that follows describes the preferred embodiment of the present invention, as well as several alternative embodiments of the present invention. Now turning to drawings, in which like numerals represent like elements throughout the several figures, FIGS. 1A and 1B show a preferred embodiment of a book assembly 10 having left pages 14 and right pages 16. The pages 14 and 16 contain textual material 12 and an activity area 18. The textual material 12, which is matter printed on the left pages 14 and right pages 16, is preferably a story or other text. For the purposes of this discussion of the preferred embodiment, the textual material 12 will be considered to be a story, such as a fable, fairy tale, or the like, although many other types of other printed matter can be used such as language lessons, science, math, music, art, drawings, and the like. The pages 14 and 16 are preferably indexed by page numbers 28.

Contained within the textual material 12 and appearing in other appropriate places on each page 14 and 16 are key indicia 20. Key indicia may be a word, a phrase, a sentence, a symbol, an object, a font, an icon, highlighting or a color code within the textual material 12. The key indicia 20 appear anywhere that is appropriate in the textual material and is visually distinguishable from the surrounding textual material 12. Such distinction can be accomplished by displaying the key indicia 20 in bold, color, highlight, different-style fonts, or other means of visual distinction known in the art. Alternatively, it is possible for the key indicia 20 to be tactilely different, such as by printing the key indicia 20 with a textured material. It is contemplated that the present invention can be used with Braille, so that blind children can read a story and be led to experience the activities by the feel of the key indicia texture. The key indicia 20 are typically a word or phrase that is a part of the story. The key indicia 20 are designed so that the child can learn recognition and meaning of the word or phrase, the context in which it is used, or other developmental skill-building exercises, particularly in language-based activities. The function and use of the key indicia 20 will be discussed in greater detail herein below. The key indicia 20 are the core around which the learning activities are designed and organized.

With respect to the preferred embodiment, each page 14 and 16 of the book assembly 10 has an activity area 18. The activity area 18 has a key indicia activity 26, which can include pictures, puzzles, mazes, and other graphical or textual instructions. The types of activities will be described in greater detail herein below. In the preferred embodiment, the activity area 18 includes a flap 22 having a knob, ribbon or tab 24, attached to the flap 22 near the operable edge of the flap 22 for opening and closing the flap 22. When the flap 22 is closed, the key indicia 20 are visible on the flap's cover and serves as a cue to the parent and child that an action can be taken with respect to the activity area 18 when the key indicia 20 are reached within the textual material 12. The child may then open the flap 22 to reveal the key indicia activity 26, which is located in an area beneath the flap 22. The opening and closing of the flap 22 not only actively involves the child in the story-telling process, but also provides a means for introducing the first activity by further developing the child's motor skills through use of a knob, ribbon or the like.

The key indicia activity 26 in the activity area 18 is preferably coordinated to the textual material 12 on the same page 14 or 16. For example, in FIG. 1B, the left page 14 has a key indicia activity 26 located under the flap 22, denoted as "key indicia 1 activity", which is coordinated to the key indicia 20, denoted as "key indicia 1", appearing within the textual material 12 on the left page 14. In addition, the right page 16 has a key indicia activity 26 located under the flap 22, denoted as "key indicia 2 activity", which is coordinated to the key indicia 20, denoted as "key indicia 2", appearing within the textual material 12 on the right page 16. The key indicia 20 are repeated in the activity area 18, as described above to provide coordination between the main textual material 12 and the activity. (See FIG. 1A). In the preferred embodiment, the textual material 12 is located at the lower portion of the pages 14 and 16, respectively, but can alternatively be positioned elsewhere on the page, such as the top of the page. The key indicia 20 and the activity area 18 should preferably be visible together on the same or the opposite page for recognition and association. It is to be understood by one skilled in the art that the key indicia 20 are typically different on each page and is coordinated with the key indicia activity 26 on the same page.

The type of activity in the activity area 18 is based on the textual material 12. Although the preferred embodiment describes one activity in association with specific key indicia, there can be more than one type of activity located in the activity area 18. Furthermore, the type of activity is preferably designed for use with a particular skill or developmental level of the child. For example, vocabulary may be appropriate for younger children, while reasoning or rhyming activities may be appropriate for older children. Different levels of activities may be in the same activity area so that the same story can generate learning activities for children of different ages. In this manner, the child can grow together with the book because the child can reread the story and the parent can teach higher skill levels as the child develops.

For example, referring to FIGS. 1A and 1B, the right page 16 may contain a story: "A family of small sky-blue butterflies gathered on the grass outside the castle." The key indicia "gathered" could be capitalized, highlighted or otherwise made more prominent from the remainder of textual material for easy identification. The key indicia "GATHERED" also appear on the flap 22 and in the key indicia activity 26. The corresponding key indicia activity 26 could instruct the parent as follows: "Say: 'Three butterflies are gathered near the trunk of the tree. There is a design in the trunk of the tree. This kind of design is called a maze. It has very winding pathways.' (P) Then ask: 'Can you put your finger on the dot in the maze and trace the path from the dot to the top of the tree trunk with your finger? Remember, if your finger bumps into a line on the path, you'll have to stop and go a different way.'" The "(P)" indicates that this particular activity is designed to develop perception skills, as will be discussed in more detail below.

Questions relating to vocabulary may be appropriate for children of ages 3–5, questions relating to word association may be appropriate for children of ages 4–5, and questions relating to observation/art skills may be appropriate for children of ages 4–6. It will be appreciated by those skilled in the art that the aforementioned age categories are presented for exemplary purposes only and may be variable, depending upon the type of question, story, subject matter, and the developmental age of the child.

Each activity area can have one or more activities. Activities can be directed to developing any of a number of learning areas, such as, but not limited to, vocabulary, thinking, art, category recognition, numbers, sounds, mathematics, motor development, following directions, perception, science, visual memory, shapes, colors, self-awareness, writing, directional words, dramatic play, observation, memory, rhyming, letters, matching, word definition, meaning, recognition and extrapolation, letter, shape, color and pattern recognition, improvement of concentration, development of imagination, drawing, motor and perception skills (such as matching, tracing, writing, mazes and hidden object recognition), picture completion, higher-level thinking skills in general, including recall, inference, evaluation, drawing conclusions, and the like.

An example of an activity such as a picture completion activity is shown in FIGS. 1A and 1B. FIG. 1A shows the page 14 preferably containing a picture portion of a sun with a sad face. The sad face is visible only when the flap 22 is closed. However, when the flap 22 is opened, as shown in FIG. 1B, the picture of the sun is completed by showing the sun with a happy face. Hence, FIGS. 1A and 1B illustrate how the pages 14 and 16 can be used to teach picture completion skills to a child or student by preferably containing picture portions that complete a picture with the activity area 18.

As shown in FIG. 2, a type of activity 42 can be coded by symbols, such as, but not limited to, letters, numbers or shapes which are indexed in a translation guide page 40. The translation guide page 40 may be preferably located in the front or back of the book assembly 10 for use by a parent to understand the nature and purpose of the activity. An age or developmental level 44 recommended for doing certain activities can be coded by a symbol or can be combined with the type of activity code 42, such as by color, shape, or a border surrounding the activity type code 42. The age level code 44 can also be translated in the translation guide page 40 for embodiments that provide multiple age level activities within an activity area. The activity type code 42 and age level code 44 are useful in providing instructions for use by the parent to determine the appropriateness of the above-mentioned activities. For example, the following activities may be accorded the accompanying codes: perception (P), science (S), visual memory (VM), shapes (SH), colors (C), self awareness (SA), writing (W), and the like.

Referring back to the example in which GATHERED is the key indicia, the code (P) 42 is used in association with the key indicia activity 26 in the activity area 18. (See FIG. 1B). When the code (P) 42 is searched in the translation guide page 40 illustrated in FIG. 2, the parent or teacher will find that the key indicia activity 26 is designed to develop perception skills.

The age level of an activity may be coded in several ways. One way that an activity and age level may be coded is to use different colored letters, whereby the letter itself indicates the type of activity and the color of the letter indicates the age level. An alternative coding method may be to use different shaped figures, within which are the activity codes. For example, a circle may represent 3–4 year olds, a triangle may represent 4–5 year olds, and a square may represent all preschool ages, i.e. 3–6 year olds. Hence, a yellow square with the letters "VM" inside may indicate that the given activity is designed to develop visual memory (VM) and is appropriate for children from ages 3–6. It will be appreciated by those skilled in the art that any suitable choice of visual variables, such as color, shape, texture, text or the like can be used for coding and translation.

In the preferred embodiment, the pages 14 and 16 are bound at a seam 30 in any conventional binding manner, such as, but not limited to, glue, staples, stitching, loose leaf binder rings, and the like. In addition, the book assembly 10 preferably has a front and back cover, 32a and 32b, respectively, which is also connected at the seam 30 in any conventional binding manner, such as those previously described. The cover may either be made up of a stiff or flexible backing material suitable for covering bound pages.

With continuing reference to FIGS. 1A and 1B, also referred to as the preferred embodiment, the discussion will now turn to FIGS. 3A–7B, which describe alternative embodiments of the present invention. Each book assembly has pages that are bound together in the manner previously described with respect to the preferred embodiment. Each book assembly may also have a front and back cover as described in the preferred embodiment.

Figure 3A:
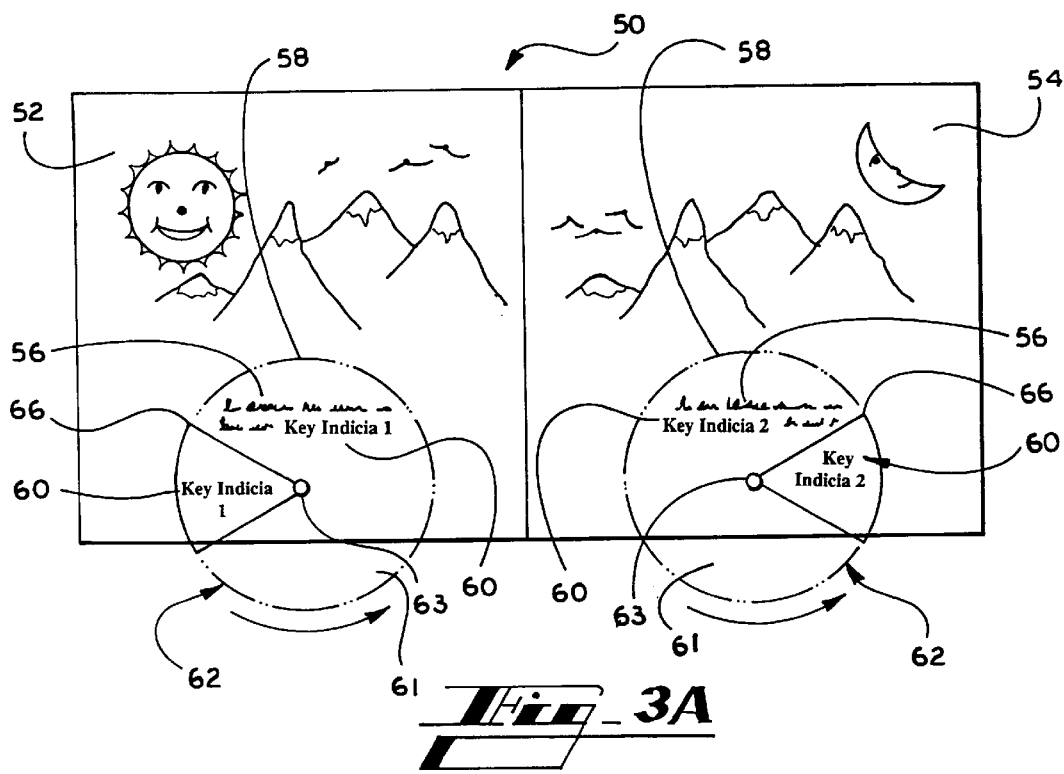
FIGS. 3A and 3B show a plan view of an alternative first embodiment of the present invention.
Figure 3B:
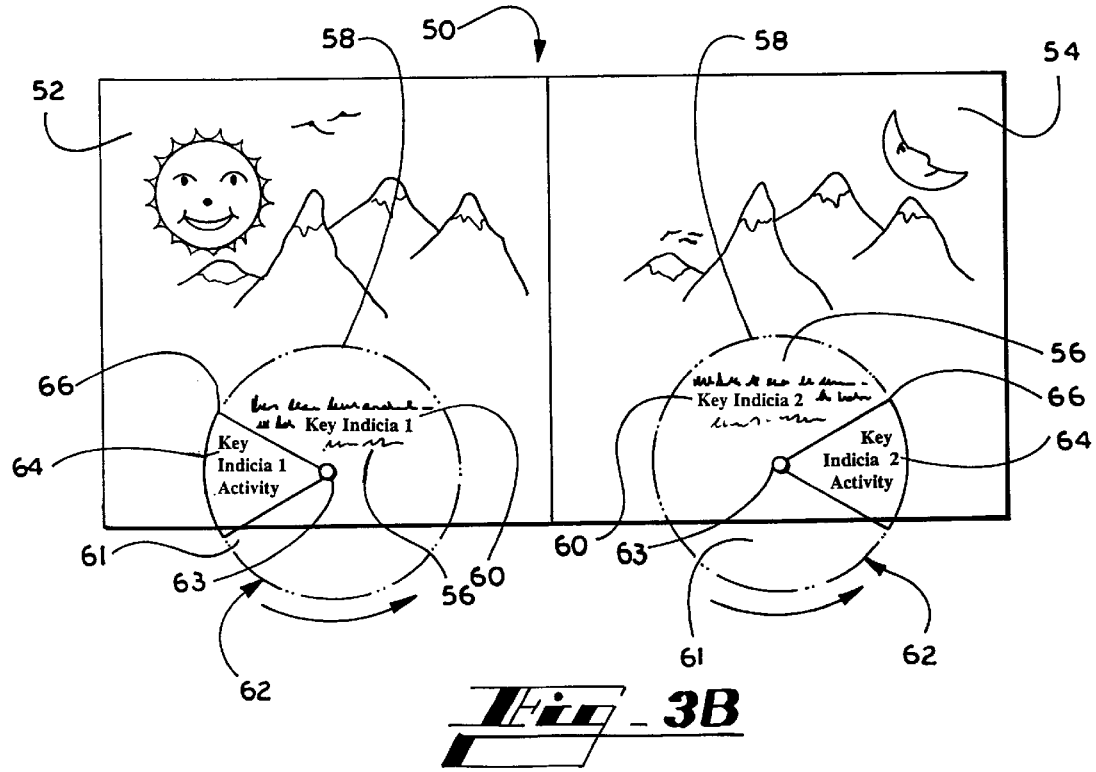

A first alternative embodiment of the present invention is shown in FIGS. 3A and 3B, wherein a book assembly 50 has left pages 52 and right pages 54, which are both two-ply sheets (not shown). The pages 52 and 54 contain textual material 56 and an activity area 58.

The activity area 58 has a key indicia activity 64, which can include pictures, puzzles, mazes, and other graphical or textual instructions as previously mentioned. In this embodiment, the activity area 58 includes a dial 62 having a window 66 for viewing the key indicia activity 64. The dial 62 is created by rotatably affixing a flat, circular sheet 61, which can be made of paper, plastic, or any other suitable material, between the plies of the pages 52 or 54. The dial 62 is rotatably affixed therebetween using a pin 63 or any other conventional means of rotatably affixing the dial 62. The pin 63 preferably affixes the center of the flat, circular sheet 61 between the pages 52 or 54 and penetrates the pages 52 or 54 adjacent to one of the outer edges of the pages 52 or 54. As an alternative construction (not shown), the dial 62 may be attached to an outer surface of the page, or formed in two discs, one lying on each surface of the page. The window 66 is carved out of a ply of the page such that a portion of the dial 62 can be seen through the window 66 of each page 52 and 54. Another portion of the dial 62 protrudes out beyond an edge of the book assembly 50 so that rotation of the dial 62 is easy and convenient.

The key indicia activity 64 initially does not appear in the window 66 of the dial 62 and is initially hidden from view by the left pages 52 or right pages 54, as shown in FIG. 3A. Instead, key indicia 60 are preferably displayed in the window 66 of the activity area 58. However, the dial 62 can be manually rotated to display the key indicia activity 64 in the window 66 of the dial 62, as shown in FIG. 3B. For example, the motor activity required can be done by a child upon simple directions from a parent. The textual material 56 is located on the pages 52 and 54 and may also overlap areas under which the dial 62 is positioned. The textual material 56 also contains the key indicia 60, as described in the preferred embodiment.

As the story unfolds and the child reaches the key indicia 60 within the textual material 56, the child may then rotate the dial 62 to reveal the associated key indicia activity 64.

The key indicia activity 64 is then displayed in the window 66 of the activity area 58 for the child and parent to perform. The key indicia activity 64 is functionally coordinated with the key indicia 60 in the manner previously described with respect to the preferred embodiment of the present invention.

Figure 4A:
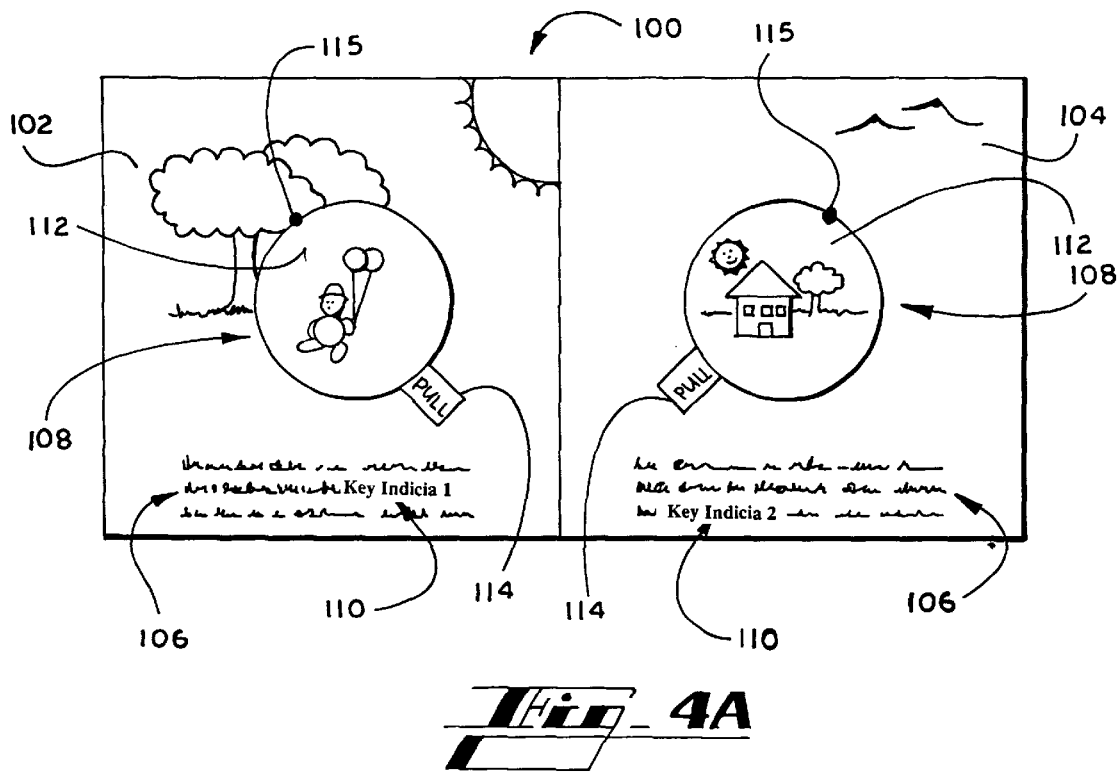
FIGS. 4A and 4B show a plan view of an alternative second embodiment of the present invention.
Figure 4B:
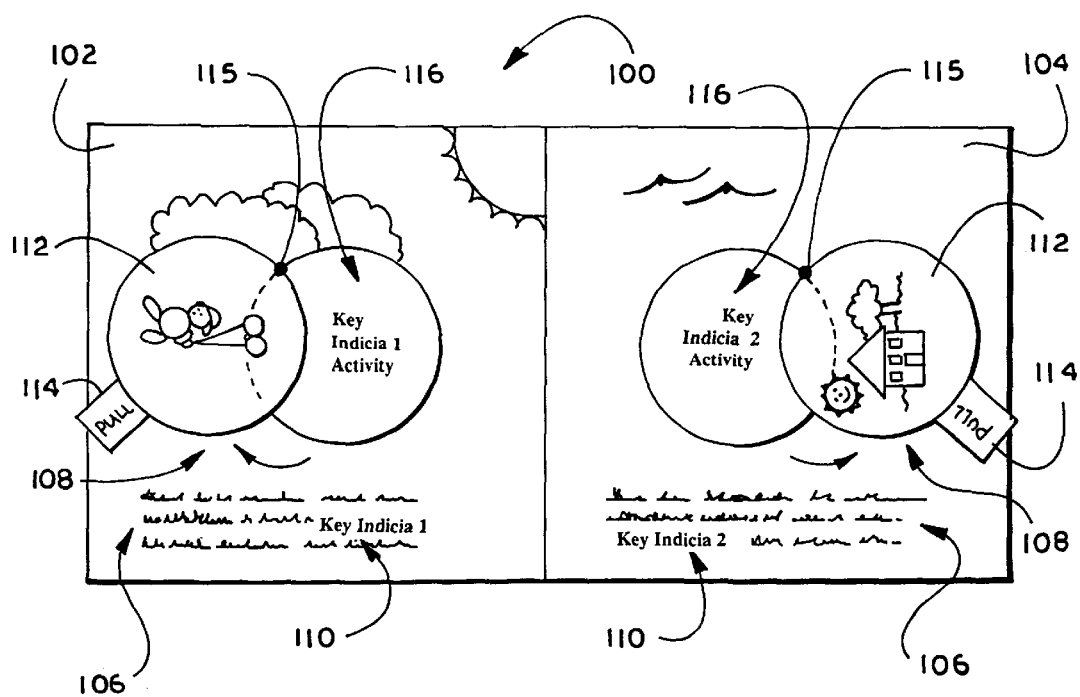

A second alternative embodiment of the present invention is shown in FIGS. 4A and 4B, wherein a book assembly 100 has left pages 102 and right pages 104. The pages 102 and 104 contain textual material 106 and an activity area 108. The textual material 106 is located at the bottom portion of the pages 102 and 104. The textual material 106 contains key indicia 110, which are also repeated in the activity area 108.

The activity area 108 has a key indicia activity 116 that is coordinated with the key indicia 110 as described in the preferred embodiment of the present invention. In the second alternative embodiment, the activity area 108 includes a disk 112 having a tab, ribbon, or knob 114 for manually rotating the disk 112 so that the disk 112 moves out of its original position. The disk 12 is a variation of the flap 22 shown in FIGS. 1A and 1B. The disk 12 is rotatably affixed to the pages 102 and 104 using a pin 115. The pin 115 is located at an edge of the disk 112 opposing the edge where the tab 114 is located. The disk 112 initially covers the key indicia activity 116. However, when the child uses the tab 114 to rotate the disk 112 out of its original position, the key indicia activity 116 are uncovered so that the parent and child can do the key indicia activity 116 associated with the key indicia 110 for that particular page.

Figure 5A:
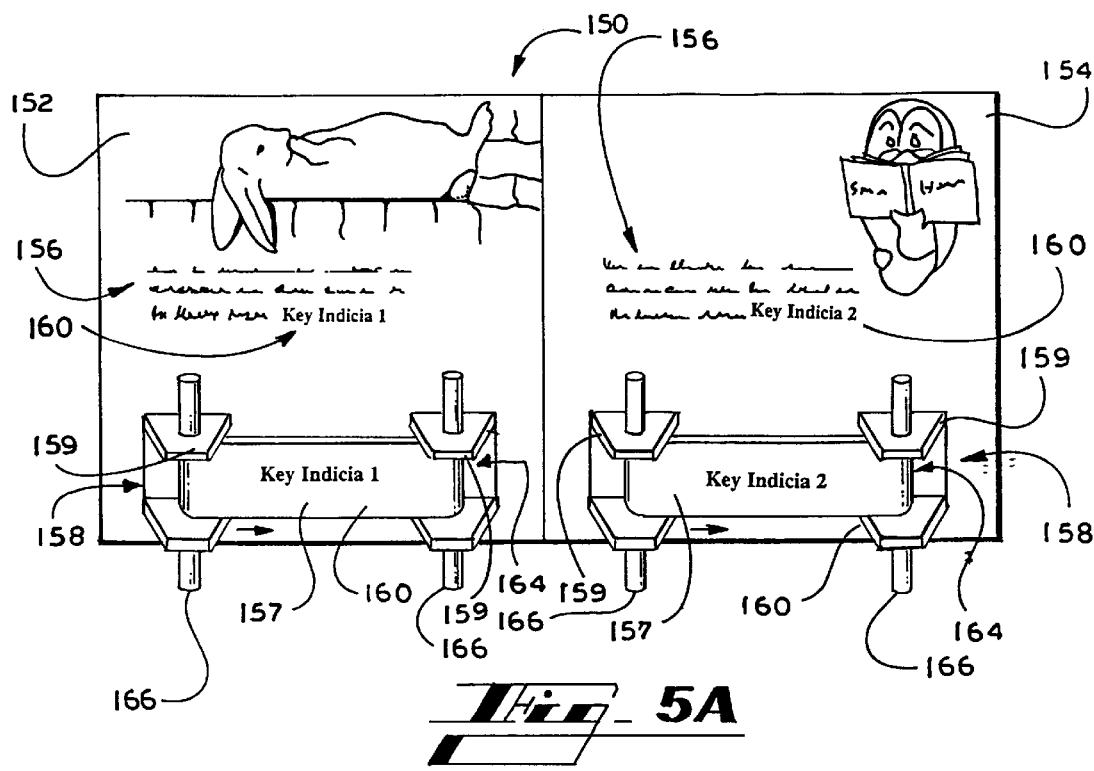
FIGS. 5A and 5B show a plan view of an alternative third embodiment of the present invention.
Figure 5B:
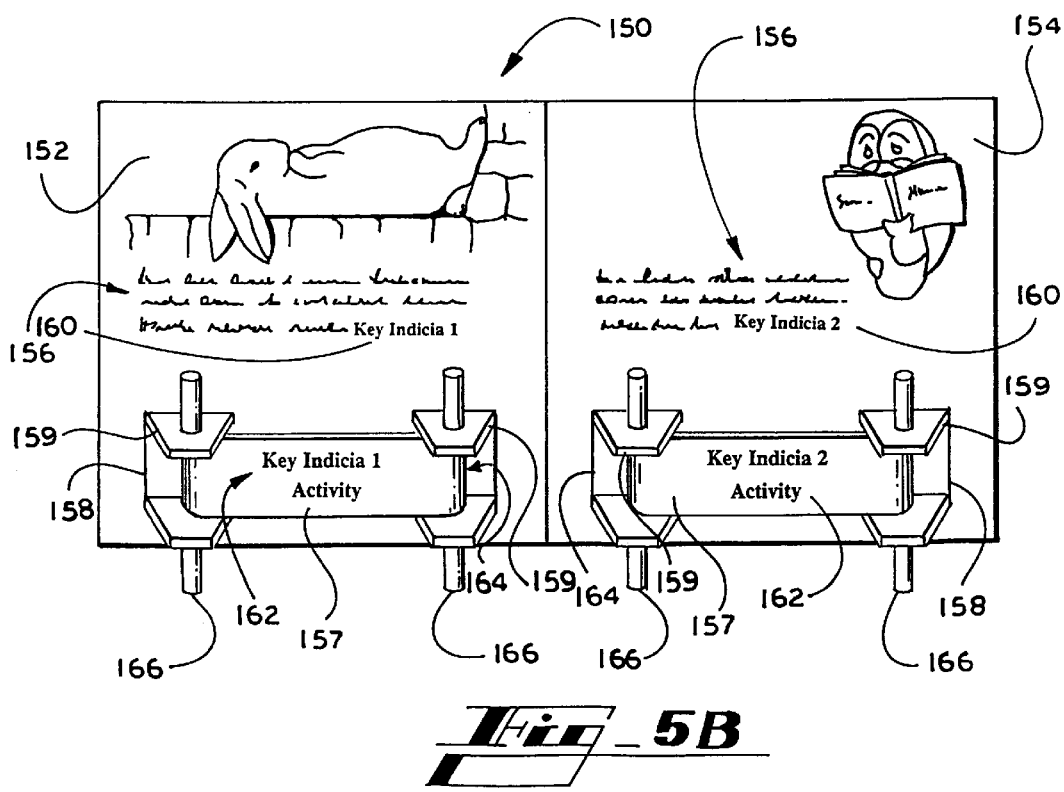

A third alternative embodiment of the present invention is shown in FIGS. 5A and 5B, wherein a book assembly 150 has left pages 152 and rights pages 154. The pages 152 and 154 contain textual material 156 and an activity area 158. The textual material 156 is located at the center portion of the pages 152 and 154. The textual material 156 contains key indicia 160, which are also repeated in the activity area 158.

The activity area 158 has a key indicia activity 162 that is coordinated with the key indicia 160 in the manner described above with respect to the preferred embodiment. In the third alternative embodiment, the activity area 158 includes a scroll 164 containing the key indicia 160 and the key indicia activity 162. The scroll 164 comprises scroll handles 166 for rotating the scroll 164, scroll paper 157, and rigid brackets 159 for supporting the scroll 164. At least two brackets 159 are attached to the pages 152 and 154 parallel to each other and are located a predetermined distance apart. The brackets 159 are attached to the pages 152 and 154 in a conventional manner such as by using glue, an adhesive, or the like. Each scroll handle 166 can be inserted into the brackets 159 and positioned such that the lower portion of the scroll handles 166 protrude out beyond an edge of the pages 152 and 154 of the book assembly 150 and are rotatable. The scroll paper 157 wraps around the upper portion of the scroll handles 166 and is rotatable.

The scroll 164 initially displays the key indicia 160, as shown in FIG. 5A. To display the key indicia activity 162, the child simply rotates both scroll handles 166 until the key indicia activity 162 rolls into view. The key indicia activity 162 is functionally coordinated with the key indicia 160 in the manner previously described with respect to the preferred embodiment.

Figure 6A:
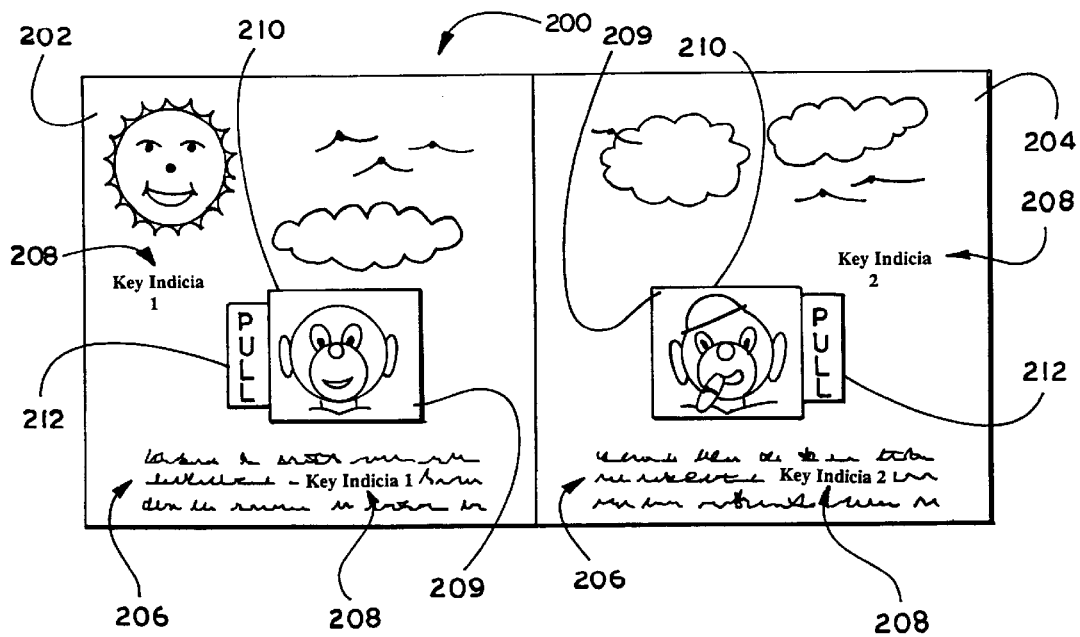
FIGS. 6A and 6B show a plan view of an alternative fourth embodiment of the present invention.
Figure 6B:
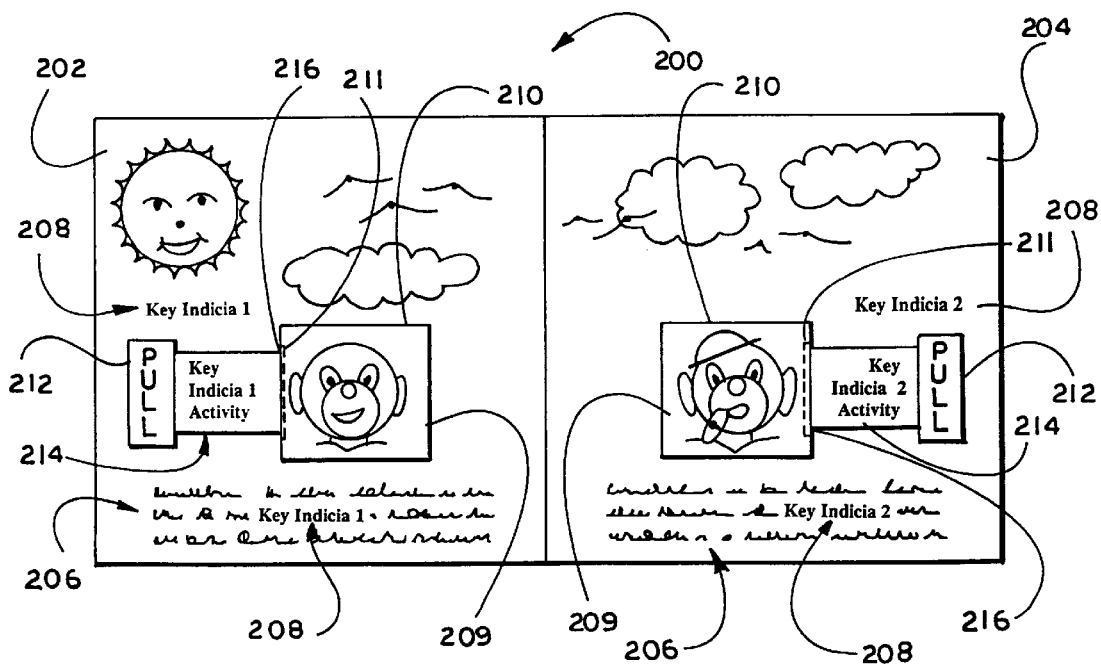

A fourth alternative embodiment of the present invention is shown in FIGS. 6A and 6B, wherein a book assembly 200 has left pages 202 and right pages 204. The pages 202 and 204 contain textual material 206 and an activity area 210. The textual material 206 is located at a distinct area, here shown, for example, in the lower portion of the pages 202 and 204. The textual material 206 contains key indicia 208, which are also repeated in the activity area 210. Key indicia can appear on the exposed tab and/or on the hidden part with the activity.

The activity area 210 has a key indicia activity 206 that is coordinated with key indicia 208 as described above. In this embodiment, the activity area 210 includes a sliding tab 212 and a slot 216 of the pages 202 and 204 from which the tab 212 emerges. The slot 216 of the pages 202 and 204 is formed by affixing a paper patch 209 to the page 202 or 204 in a manner that leaves the slot 216 at one edge of the sheet 209 and ample unconnected area between the page 202 or 204 and the patch 209. The space between the page 202 or 204 and the patch 209 is preferably sized so that the tab 212 fits therebetween and is capable of sliding in and out of the slot 216. The tab 212 has a T-shaped end 211 located between the page 202 or 204 and the patch 209. The T-shaped end 211 is larger than the slot 216 and acts as a stop to prevent the tab 212 from being entirely removed from under the patch 209 when the tab 212 is pulled. Before the tab 212 is pulled, the key indicia activity 214 is initially hidden from view. To display the key indicia activity 214, the child simply pulls the sliding tab 212 outward, as shown in FIG. 6B, thereby revealing the key indicia activity 214.

Figure 7A:
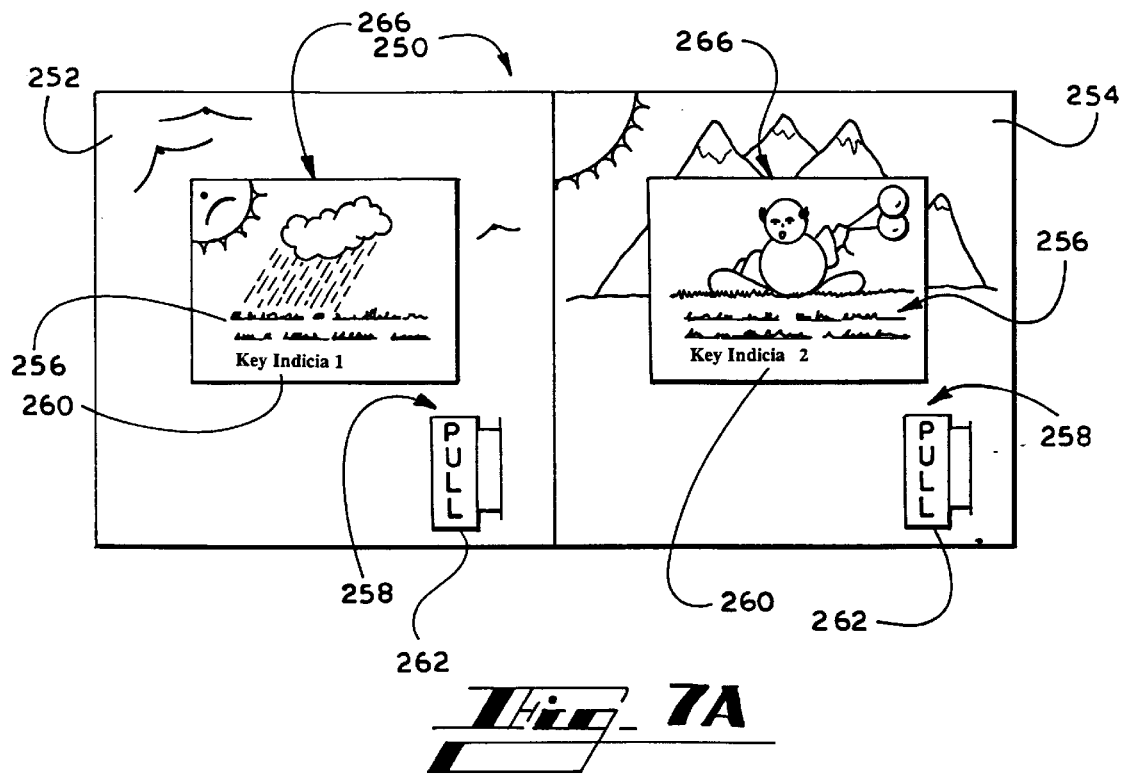
FIG. 7A and 7B show a plan view of an alternative fifth embodiment of the present invention.
Figure 7B:
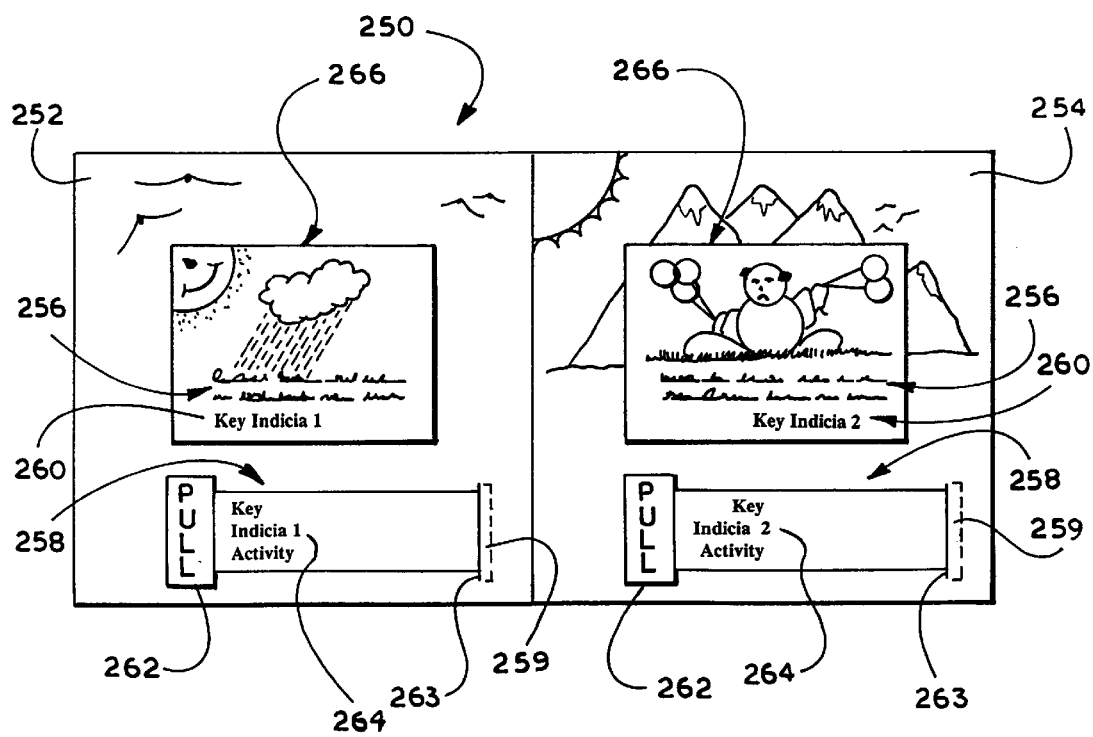

A fifth alternative embodiment of the present invention is shown in FIGS. 7A and 7B, wherein a book assembly 250 has left pages 252 and right pages 254, which are both two-ply sheets (not shown). The pages 252 and 254 contain textual material 256 and an activity area 258. The textual material 256 is located in the center of pages 254 and 256 and is preferably sectioned off by a border 266. The textual material 256 contains key indicia 260, which are coordinated with a key indicia activity 264 as described above. Key indicia can appear on the exposed tab and/or on the hidden part with the activity.

The activity area 258 contains a sliding tab 262 located at the bottom of pages 252 and 254. The sliding tab 262 emerges from the activity area 258, which has a slot 263. The slot is formed in one of the two plies of the pages 252 and 254, capable of receiving the tab 262 within the two-ply sheet of paper. The tab 262 is capable of sliding in and out of the slot 263. The tab 262 has a T-shaped end 259, as similarly described with respect to FIGS. 6A and 6B. The T-shaped end 259 is larger than the slot 263 and acts as a stop to prevent the tab 262 from being entirely removed from between the page 252 or 254 when the tab 262 is pulled. The sliding tab 262 contains the key indicia activity 264, which is initially hidden from view by pages 252 and 254. To reveal the key indicia activity 264, the child simply pulls the sliding tab 262, as shown in FIG. 7B, thereby revealing the coordinating key indicia activity. It will appreciated by those skilled in the art that the present invention is neither limited to one sliding tab per page nor limited to the sliding tab being physically located at the bottom of the page. The present invention may contain multiple sliding tabs on each page located at various positions on the page. Also, the key indicia 260 can be located on the tab 262.

Figure 8:
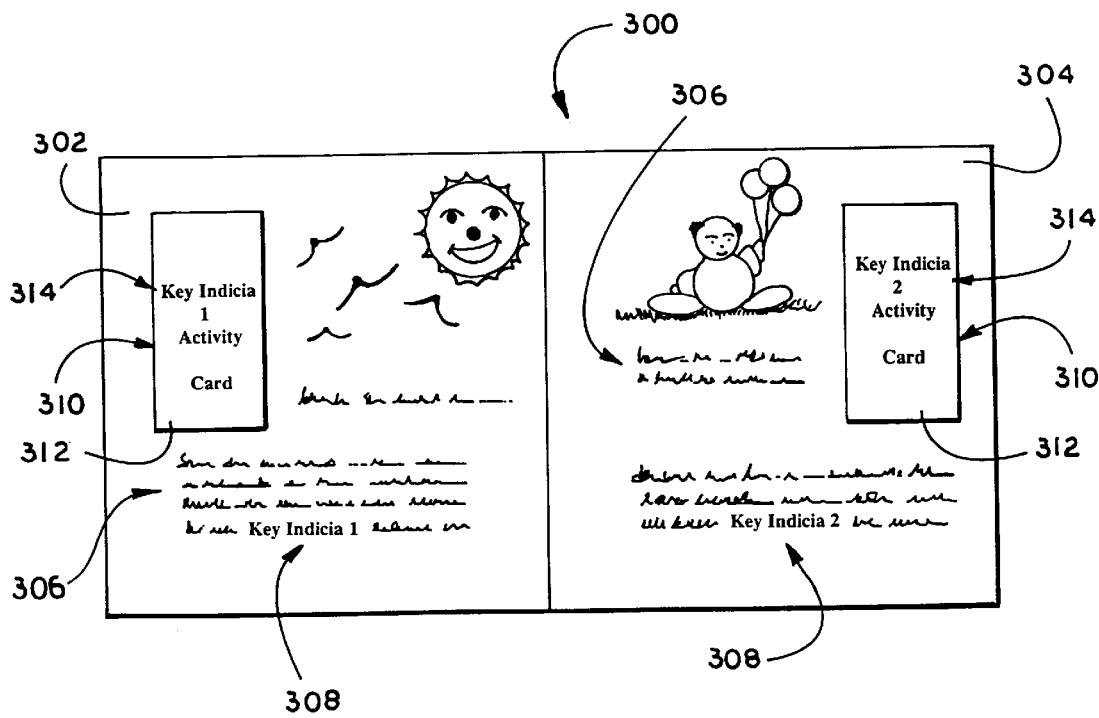
FIG. 8 shows a plan view of an alternative sixth embodiment of the present invention.

The following alternative embodiments in FIGS. 8 and 9 represent a set of variations of the present invention in which the book assembly generally comprises a plurality of pages, which are bound according to conventional binding methods to form a book, having textual material, key indicia and an activity area and having multiple sets of key indicia activity cards for specific skill levels. Each key indicia activity card contains at least one key indicia activity. Each set of key indicia activity cards is coordinated with the book assembly, and specifically, each card in a set has a one-to-one correlation with each key indicium that appears in the textual material in the book assembly. In these embodiments, the activity area for each page is capable of receiving a key indicia activity card. Thus, these embodiments form kits or assemblies in which the book assembly can be used with a set of key indicia activity cards that are specific to a child's skill level.

FIG. 8 shows a sixth alternative embodiment of the present invention, in which a book assembly 300 has left pages 302 and right pages 304, which are bound together as previously described. The pages 302 and 304 contain textual material 306 and an activity area 310. The textual material 306 contains key indicia 308. The key indicia 308 are coordinated with a key indicia activity 314, which is located on a key indicia activity card 312. The activity area 310 is capable of receiving the key indicia activity card 312 that corresponds to the key indicia 308 that appears on the pages 302 and 304. Hence, each key indicia activity card 312 is attached to the activity area 310 of the appropriate page. The key indicia activity card 312 is attached in a conventional manner known in the art, such as by inserting the card into a slot formed between two plies of a double layer page in the activity area, stapling, tacking, using Velcro fasteners, using releasable adhesive, or the like, so long as the cards can be replaced without damaging the book assembly. For example, as shown in FIG. 8, the card 312 is directly adhered to the pages 302 and 304 by a releasable adhesive. It will be appreciated by those skilled in the art that the activity area for receiving a key indicia activity card is not limited to the embodiments presented above, but may also include an embodiment where the activity area is located at the top, in the center, or at the bottom of the page, and so forth.

Turning to FIG. 9, an eighth alternative embodiment is illustrated. A book assembly 400 has a stiff backing 402, left pages 404 and right pages 406. The pages 404 and 406 are bound together in a conventional manner and attached to the lower portion of the stiff backing 402. The pages 404 and 406 contain textual material 408 and may also preferably contain pictorial material 414. The textual material 408 contains key indicia 410. The key indicia 410 are coordinated with a key indicia activity 418 located on a key indicia activity card 416, as previously described. The backing 402 contains an activity pocket 412 for maintaining a complete set of key indicia activity cards 416. The key indicia activity cards 416 are in sequential order such that the first activity card corresponds to the first key indicia to appear in the textual material 408, the second activity card corresponds to the second key indicia to appear in the textual material 408, and so forth. As a child reaches each of the key indicia in the textual material on the various pages of the book assembly, the child may remove the associated activity card from the activity pocket 412 and do the activity. This initial motor activity corresponds to the uncovering of the activities in previous embodiments. The child follows this procedure for each of the key indicia in the textual material until there are no more cards. These key indicia activity cards 416 can be replaced by a different set of key indicia activity cards that are coordinated with the specific book assembly 400, but having a different skill level or skill area.

Using the present invention, a story can be reread many times over an extended period of years and, while the story remains the same, the child can learn more advanced skills by the parent utilizing different sets of cards coded for the child's level of development. Similarly, the same book can be read by a different child, and the child can learn at his or her own skill level.

The ninth alternative embodiment in FIGS. 10A and 10B presents a variation of the present invention in which the book assembly generally comprises a main book and an activity book, the pages of which are interleaved and coordinated such that the main book has text pages with the story text printed thereon interleaved with activity pages that have pictures or other activity material. The key indicia appear in the text page and is repeated in the activity area and is coordinated with an activity. A support backing has direction text books attached to both the left and right edges of the sides of the backing. The direction text in the direction books contains the repeated key indicia, corresponding activity direction text, which contains matter selected from the group consisting of statements, questions, and instructions, and skill symbols coordinated with the main book. The main book is removably attached to the backing.

Now turning to FIGS. 10A and 10B, a book assembly 500 has a stiff flat support backing 510 which is flexibly bendable in the middle at a vertical seam 512, enabling the two halves thus defined to be closable in the same way that a book closes. A main book 520 has left main text pages 522 and right main text pages 524 interleaved with left activity pages 526 and right activity pages 528 and is removably attached to the backing 510 by VELCRO fasteners, by an elastic band or other conventional retention means (not shown). The main text pages 522 and 524 are preferably smaller in size than the activity pages 526 and 528. This permits pictures on the activity pages 526 and 528 to be seen while a child is reading the main text. The text pages can contain picture portions that complete a picture with the activity area used to teach picture by repeat skills. Key indicia 529 are reverse coordinated by repeating them as part of the activity page 526 or 528 opposite the text page in which the word contextually appears in the story, in addition to repeating the key indicia 529 in direction text books 550 and 552 for purposes of coordination.

The left portion 540 of the backing 510 has a second support member or left flap 542 extending from and attached to a left edge 544 in a flexible manner, such as by a strip of flexible tape. The right portion 546 of the backing 510 has a third support member or right flap 548 extending from and attached to a right edge 549 in a flexible manner, such as by a strip of flexible tape.

A first direction book 550 contains a plurality of pages 534 and is attached using staples 536 or any other conventional means of attachment to the second support member 542 and a second direction book 552 contains a plurality of pages 533 and is attached using staples 536 to the third support member 548. The direction books 550 and 552 open outward, i.e., away from the main book 520 and fold inward to provide a closable compact assembly. The direction book 550 contains direction text and repeats the key indicia that relates to the left page 522 of the main book 520 and the direction book 552 contains directions and repeats the key indicia relevant to the right page 524, both in an indexed manner.

In this manner, the backing 510, the support members 542 and 548 and the direction books 550 and 552 form a shell to which different main books 520 can be removably attached. One main book 520 can be used with different direction text booklets and different activity pages so that as the child develops different skill level activities and directions can be utilized. This kit embodiment presents the advantage that a child can read the book 520 separate from the backing 510 and the direction books 550 and 552. In the case where a different main book 520 is to be attached to the backing 510, either the books 550 and 552 would be removably attached to the backing 510 and replaced with the appropriate direction booklets for the new main book 520, or, a new backing 510 with appropriate direction books 550 and 552 would already be attached to the backing 510. In the situation where direction books 550 and 552 would be removably attached, they could be attached with VELCRO fasteners or other removable attachment means commonly known in the art. A tracing paper pad 560, which will be described in greater detail with respect to FIG. 11 below, can be removably attached to the inside back and/or front covers of the main book 520.

As shown in FIG. 11, the book assembly 610 optionally has incorporated with it a tracing paper pad 650, which comprises a stiff backing 652 and tracing paper pages 654, as are commercially available from art supply stores. The book assembly 610 has a preferably rigid cover 656 to which the pad 650 can be removably attached, such as by VELCRO fasteners, glue or by a slot 658 in the cover 656 into which the backing 652 can be slid. The tracing paper 654 can be overlaid on the activity area pages 622 and a child can draw, trace or color over visual material on those pages. It is to be understood that the tracing pad 650 can also be on the inside front cover or on both inside covers. Alternatively, the tracing pad 650 can be on the outside cover, if desired. The pad can be removed for storage or replacement.

Each of the embodiments of the present invention can incorporate one or more tracing pads that can be removably attached to the backing of the front and/or back covers of the book assembly as described above.

FIGS. 12A through 12C illustrate an aspect of the present invention that is particularly useful for working with children with particular types of learning impairments, particularly dyslexia. It is known to educators that children with perceptual problems such as dyslexia can be aided by viewing text or pictures through a transparent, pastel colored overlay. Pink or green are often used. FIG. 12A shows one arrangement in which a backing for the book 1750 is fitted with a pair of conventional threaded posts, one of which is visible as 1751 that mates with a threaded screw 1752. A pad 1755 of tracing paper such as velum can be provided with perforations, indicated at 1756, so that the sheets may be torn off one sheet at a time. These are also drilled, as illustrated in phantom at 1757 so that screw 1752 can be passed through to threaded post 1751 to secure pad 1755 in place. In FIG. 12A, a sheet of transparent pastel colored acetate, is indicated at 1758. Sheet 1758 is provided under pad 1755 of tracing paper. FIG. 12B shows an alternate construction in which a similar acetate sheet 1758' is attached so as to be folded over the top of pad 1755 and laid on top of the upper most sheet thereof.

In using the embodiment of FIG. 12A, the material to be traced in inserted between acetate sheet 1758 and backing 1750, i.e., in the area indicated at 1759. For example, pages of the book for which back 1750 is the backing can be turned under sheet 1758 until something the child wishes to trace appears. When this configuration is achieved, acetate sheet 1755 is laid over the material to be traced and all pages save the bottom page of pad 1750 of tracing papers are flipped upward so that the bottom sheet of tracing paper lays over acetate sheet 1758. With this arrangement, the pastel color will still provide the benefits to the dyslexic child even against a typically white or off white background of tracing paper.

In the embodiment of FIG. 12B, it is preferable to fold both acetate sheet 1758 and the top sheet of pad 1755 back away from post 1751, and lay the page upon which the drawings to be traced appears over the balance of pad 1755. The selected sheet of tracing paper is then laid over the picture, and finally acetate sheet 1758' is laid over the tracing paper. The child can view this, and trace with a nonmarking stylus or the like. The acetate sheet 1758 can then be lifted for tracing directly onto the paper with a marking pencil or similar device. The acetate sheet 1758' may be alternately overlaid and removed from the top of the tracing paper sheet in this arrangement to assist the child in forming a perception of what is illustrated on the page being traced.

To give a simple illustrative example, FIG. 12C has been included showing use of the structure shown in FIG. 12A. A picture including three circles, indicated at 1765, appears on a page 1766. Transparent acetate overlay sheet 1758 is laid over the page including three circle 1765. The user will then pull the next nearest sheet of pad 1755, indicated at 1767 down over acetate sheet 1758 and commence to trace the three circles.

It will be appreciated that post 1751 and screw 1752 constitute a means for attaching at least one sheet of tracing paper and a flexible colored web 1758 to a cover 1750 of the book assembly described herein. It will be appreciated by those skilled in the art that other equivalent apparatus may be used to attach the pad of tracing paper and the flexible colored web, such as acetate sheet 1758, to the cover of a book. For example, flexible file clips, sometimes referred to as Arco™ type clips, may be used to attach the combination of tracing paper pad and colored web to the cover. Alternately, by way of additional example and not limitation, spring loaded parallel linkages, such as those used in folders for holding writing pads, may be used for the same purpose. The only limitation on equivalent structures for those shown in FIGS. 12A and 12B are that they accommodate a pad of tracing paper which can have perforations near the point at which the pad is held to the cover and can also secure the colored web in the appropriate location.

The use of the described structure with pastel colored acetate sheets is of assistance in helping dyslexic children. It constitutes structure of preferred forms of the present invention that is particularly useful by such children, but does not form an essential part of the present invention.

FIG. 13 shows a further alternative embodiment of the present invention using activity cards similar to those described in connection with the embodiments of FIGS. 8 and 9. A book 800 is provided with a pocket 802 in one of its outside covers. The pocket may receive a set of activity cards 804 preferably arranged in sequential order in coordination with key indicia as they appear in textual material in the book 800. This relationship is similar to that of the cards 416 and the key indicia 410 of the embodiment of FIG. 9 described. If desired, the activity cards 804 may duplicate activities found inside the book in a form according to any of the previous embodiments. It will be appreciated by those skilled in the art that the present invention is not limited to a set of loosely held cards, but may also include cards of a set that are connected to each other by conventional means such as a ring, chain, or any other suitable means to prevent cards of a set from being lost or separated from the set.

However, use of the exterior pocket 802 allows a parent or teacher to keep the book turned open toward a child C so that the child can see the pictures at the same time that the parent or teacher reads the activities from the cards 804 in the pocket on the outside cover of the book. The pocket 802 may be placed in either the front or the back cover of the book 800.

While the present invention has been described with respect to child/parent education materials, the present invention can also be adapted for use by students in school or as a self-study guide or between a teacher and one or more students.

It is an advantage and a distinction over the prior art that the present invention is integrated into a textually coordinated and indexed set of materials that can be utilized by a parent and a child together to develop skills. Prior instructional books do not have the coordinated direction text areas coordinated with given key indicia which are easily accessible as with the present invention. The present invention seeks to increase the interaction between parent and child and to provide simple to follow instructions for the parent to educate their child. Directions for activities can be in italics or other distinguishable print. Moreover, the coding of the various types of activities and the coding of the age level of the activity can indicate to the parent the appropriate activity with which to challenge the child. The manipulation of various parts to reveal an activity area provides beneficial motor development as the child's first activity.

The use of visually distinguishable key indicia, such as by highlighting or bold-faced print, makes identification of the key indicia easy. The key indicia are chosen to be contextually important in the text.

Unlike other activity workbooks currently in use, parents or teachers do not need to rephrase or restructure the directions presented in this integrated text and workbook in order to present the material to the person being instructed. Instead, the parent or reader simply finishes reading the sentence containing the key indicia in the text and then reads the material just as it is presented in the activity area. Since the key indicia in the text are re-introduced in the activity area, a continuous integrated presentation results, beginning with the key indicia and continuing through the coordinated activity directions. After the child has completed each activity as directed, the process can be repeated for as many activities as desired.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An interactive book assembly with a coordinating key indicia for reaching a concept to a user, comprising:

a plurality of pages containing textual material incorporating a first representation of a key indicia associated with a concept in the context of the textual material, and an activity area displaying a second representation of the key indicia, the first and second representations of the key indicia being simultaneously visible; and instruction indicia within said activity area instructing a user how to perform an activity selected to assist the user's understanding of the concept associated with the first representation of the key indicia;

whereby the activity is coordinated with the concept by the repetition of the key indicia, which directs the user to the activity area; and said activity area having means for revealing said activity in said activity area.

2. The assembly of claim 1, wherein said key indicia are selected from a group consisting of a word, a phrase, a sentence, a symbol, an object, a font, highlighting, an icon, and a color code in said textual material.

3. The assembly of claim 1, wherein said revealing means is a flap that opens to reveal said activity and closes to conceal said activity.

4. The assembly of claim 1, wherein said revealing means is a rotating dial having a window for viewing said activity.

5. The assembly of claim 1, wherein said revealing means is a rotating scroll.

6. The assembly of claim 1, wherein said revealing means is a rotating disk having a grasping tab.

7. An interactive coordinated book assembly, comprising:

a plurality of pages, each of said pages containing textual material, a key indicia and an activity area containing instructions for conducting an activity;

said activity located on one of said plurality of pages being coordinated with said key indicia appearing on the same said one of said plurality of pages;

said activity area having a rotating dial movable to reveal said activity in said activity area through a window in said dial; and said pages being bound along an edge to form a book.

8. An interactive coordinated book assembly, comprising:

a plurality of pages, each of said pages containing textual material, a key indicia and an activity area containing instructions for conducting an activity;

said activity located on one of said plurality of pages being coordinated with said key indicia appearing on the same said one of said plurality of pages;

said activity area having a rotating scroll movable to reveal said activity in said activity area; and said pages being bound along an edge to form a book.

9. An interactive coordinated book assembly, comprising:

a plurality of pages, each of said pages containing textual material, a key indicia and an activity area containing instructions for conducting an activity;

said activity located on one of said plurality of pages being coordinated with said key indicia appearing on the same said one of said plurality of pages;

said activity area having a rotating disk having a grasping tab movable to reveal said activity in said activity area; and said pages being bound along an edge to form a book.

10. A method for reaching a concept using an interactive coordinated book assembly with a key indicia, comprising;

reading a story containing a first representation of a key indicia associated with a concept in the text of the story;

finding the key indicia within the story;

locating a second representation of the key indicia in an activity area, said representations of said key indicia being simultaneously visible;

revealing hidden instruction indicia in the activity area describing how to perform an activity selected to assist the person's understanding of the concept associated with the first representation of the key indicia; and following the instruction indicia to instruct the person how to perform the activity.

11. A method for interactively teaching a concept using an interactive coordinated book assembly with a key indicia, wherein:

a first person carries out the steps of:

reading a story containing a first representation of a key indicia associated with a concept in the text of the story;

finding the key indicia within the story;

directing the attention of a second person to the key indicia;

locating a second representation of the key indicia in an activity area, said representations of said key indicia being simultaneously visible;

one of said persons revealing hidden instruction indicia in the activity area describing how to perform an activity selected to assist the second person's understanding of the concept associated with the first representation of the key indicia;

said first person following the instruction indicia to instruct the second person how to perform the activity; and said second person performing the activity.

12. An interactive book assembly, comprising:

a plurality of pages containing textual material incorporating a first representation of a key indicia associated with a concept in the context of the textual material, and an activity area displaying a second representation of the key indicia, the first and second representations of the key indicia being simultaneously visible;

wherein the activity area has a pullable sliding tab containing instruction indicia instructing a user how to perform an activity selected to assist a user's understanding of a concept associated with the key indicia;

wherein the instruction indicia located on said pullable sliding tab is coordinated with the concept by the repetition of the key indicia which directs the user to the activity area; and wherein the pullable sliding tab is operative to reveal instruction indicia when the pullable sliding tab is pulled.

13. The assembly of claim 12, wherein said key indicia are visually distinguishable from the surrounding textual material on said pages.

14. A method for teaching a concept using an interactive book assembly comprising:

a plurality of pages, each of said pages incorporating a first representation of a key indicia associated with a concept in the context of the textual material, and an activity area displaying a second representation of the key indicia, the first and second representations of the key indicia being simultaneously visible;

said pages being bound along an edge to form a book;

wherein the activity area has a pullable sliding tab containing instruction indicia coordinated with a concept associated with the key indicia for each of said pages; and wherein the instruction indicia located on said pull a with the concept by ordinate with the concept by the repetition of the key indicia which directs the user to the activity area;

wherein the pullable sliding tab is operative to reveal instruction indicia when the pullable sliding tab is pulled;

said method comprising the steps of:

turning said pages; and revealing said instruction indicia by pulling the pullable sliding tab containing instruction indicia instructing a user how to perform an activity selected to assist a user's understanding of the concept associated with the key indicia;

following said instruction indicia to instruct the user how to perform the activity.

* * * * *